(12) United States Patent
Girardeau et al.

(10) Patent No.: US 7,099,398 B1
(45) Date of Patent: Aug. 29, 2006

(54) METHOD AND APPARATUS FOR ESTABLISHING NON-STANDARD DATA RATES IN A WIRELESS COMMUNICATION SYSTEM

(75) Inventors: James Ward Girardeau, Austin, TX (US); Bradley Wallace, Austin, TX (US); Christopher Alan Aardema, Austin, TX (US)

(73) Assignee: Vixs, Inc., Toronto (CA)

( * ) Notice: Subject to any disclaimer, the term of this patent is extended or adjusted under 35 U.S.C. 154(b) by 470 days.

(21) Appl. No.: 10/026,129

(22) Filed: Dec. 18, 2001

(51) Int. Cl.
*H04L 23/02* (2006.01)

(52) U.S. Cl. .................... 375/265; 375/225

(58) Field of Classification Search ............ 375/240.1, 375/240.27, 240.23, 240.24, 262, 265, 341, 375/261, 225; 714/784, 786, 790, 774
See application file for complete search history.

(56) References Cited

U.S. PATENT DOCUMENTS

| | | | | |
|---|---|---|---|---|
| 5,691,992 A | * | 11/1997 | Molnar et al. ............ | 714/752 |
| 6,088,828 A | * | 7/2000 | De Bart et al. ............ | 714/789 |
| 6,101,626 A | * | 8/2000 | Morelos-Zaragoza et al. ............ | 714/786 |
| 6,134,696 A | * | 10/2000 | Morelos-Zaragoza et al. ............ | 714/790 |
| 6,157,683 A | * | 12/2000 | Daribi et al. ............ | 375/341 |
| 6,684,366 B1 | * | 1/2004 | Trott et al. ............ | 714/790 |
| 6,711,710 B1 | * | 3/2004 | Jiang et al. ............ | 714/784 |

OTHER PUBLICATIONS

Part 11: Wireless LAN MAC and PHY specification.

* cited by examiner

*Primary Examiner*—Emmanuel Bayard
(74) *Attorney, Agent, or Firm*—Garlick, Harrison & Markison, LLP.; Timothy W. Markison

(57) ABSTRACT

A method and apparatus for establishing a non-standard data rate in a wireless communication system include processing that begins by establishing a standard specified data rate for a given transmission. The processing then continues by determining whether the data rate of the transmission can be adjusted from the standard specified data rate by a non-standard data rate adjustment. The processing then continues when the data rate can be adjusted, adjusting the data rate to a non-standard data rate for the given data transmission.

26 Claims, 4 Drawing Sheets wireless communication device 10
(transmitter section)

wireless communication device 40
(receiver section)

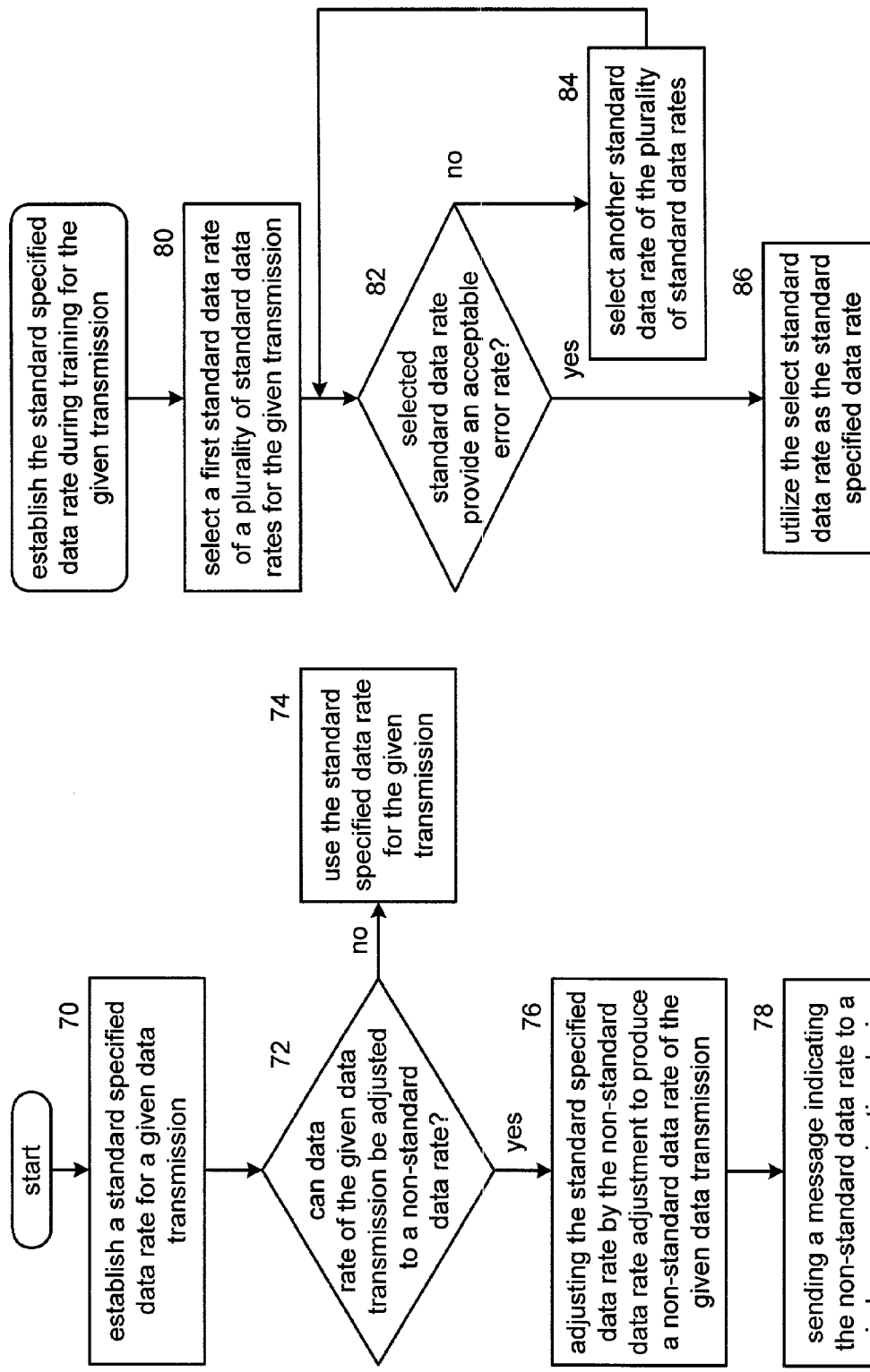

METHOD AND APPARATUS FOR ESTABLISHING NON-STANDARD DATA RATES IN A WIRELESS COMMUNICATION SYSTEM

TECHNICAL FIELD OF THE INVENTION

This invention relates generally to wireless communication systems and more particularly to varying data rates of transmissions within such a wireless communication system.

BACKGROUND OF THE INVENTION

Wireless communication systems are known to include a plurality of wireless communication devices that communicate directly (e.g., point-to-point) or through an infrastructure. For direct communications, a wireless communication device, such as a radio, cellular telephone, station coupled to a personal computer or laptop, et cetera, transmits data on a particular radio frequency channel directly to another wireless communication device. For infrastructure-supported communications, a wireless communication device transmits data on an assigned radio frequency channel to an access point (or a base station). The access point determines the targeted wireless communication device from the received RF signals. If the targeted wireless communication device is affiliated with the access point, the access point transmits the data to the targeted wireless communication device on a radio frequency channel. If the targeted wireless communication device is not affiliated with the access point, the access point forwards the data to a central station, which routes the data to the access point that is affiliated with the targeted wireless communication device.

To ensure reliability of data transmissions within a wireless communication system and to ensure interoperability of differing manufacturers' equipment, standards have been developed. Such wireless communications standards include IEEE8 02.11, Bluetooth, advanced mobile phone services (AMPS), digital AMPS, global system for mobile communications (GSM), code division multiple access (CDMA), wireless application protocols (WAP), local multi-point distribution services (LMDS), multi-channel, multi-point distribution systems (MMDS), and/or variations thereof.

Such standards prescribe operating parameters for a particular type of wireless communication system. For example, the IEEE 802.11a standard defines a wireless local area network that prescribes a frequency band of use, division of the frequency band into channels and sub-channels, encoding/decoding convention, modulation/demodulation convention, frame format, data rates, et cetera. For instance, the IEEE 802.11a standard provides various combinations of data rates and modulation schemes, which can be selected via a coding rate corresponding to a particular modulation scheme.

As is known for wireless local area networks, wireless communications devices roam within the coverage area of the wireless local area network. As such, signal strength of radio frequency signals to and from a wireless communication device varies depending on the interference between the wireless communication device and another wireless communication device or the access point and the distance therebetween. In accordance with the IEEE 802.11a standard, data rates and modulation schemes may be adjusted based on signal strength and/or interference of RF signals. For example, if the signal strength is strong and there is minimal interference, the communication may be done at 54 Mbps (megabits per second) using a 64 QAM (quadrature amplitude modulation) modulation scheme. If, on the other hand, the signal strength is weak and/or there exists substantial interference, the communication may be done at 6 Mbps using a BPSK (binary phase shift keying) modulation scheme.

The various combinations of data rates and modulation schemes prescribed by the IEEE 802.11a standard provides adequate granularity of data rates for typical data transmissions (e.g., email, file transfers, and internet access) for wireless communication devices that move within the local area network. However, for relatively stationary wireless communication devices that transmit and/or receive video data, the granularity of data rates provided by the IEEE 802.11a standard may not be sufficient. For example, data rates, which are spaced at 12 Mbps. Thus, if a wireless communication device barely fails to support a 48 Mbps rate it drops to a 36 Mbps data rate. For MPEG video streams, which have a bandwidth of about 2 Mbps, the change from 48 Mbps to 36 Mbps reduces the number of video streams that a channel can support by 6. Such a loss of potential video streams on a particular channel in many applications is highly undesirable.

Therefore, a need exists for a method and apparatus that provides for greater granularity of standardized data rates in a standard compliant wireless communication system.

BRIEF DESCRIPTION OF THE DRAWINGS

FIG. 3 illustrates a logic diagram of a method for establishing non-standard data rates in accordance with the present invention;

FIG. 4 illustrates a logic diagram that further describes Step 70 of FIG. 3;

DETAILED DESCRIPTION OF A PREFERRED EMBODIMENT

Generally, the present invention provides a method and apparatus for establishing a non-standard data rate in a wireless communication system. Such a method and apparatus include processing that begins by establishing a standard specified data rate for a given transmission (e.g., selecting a data rate in accordance with a standard). The processing then continues by determining whether the data rate of the transmission can be adjusted from the standard specified data rate by a non-standard data rate adjustment (e.g., error rate is sufficient to support a data rate greater than the selected data rate, but may not be sufficient to support next higher standardized data rate). The processing then continues when the data rate can be adjusted, adjusting the data rate to a non-standard data rate for the given data transmission. With such a method and apparatus, finer granularity of data rates is achieved, thus allowing local area networks to support additional streams of data on a given channel, including MPEG video data, in comparison to local area networks that only use the standardized data rates.

Figure 1:
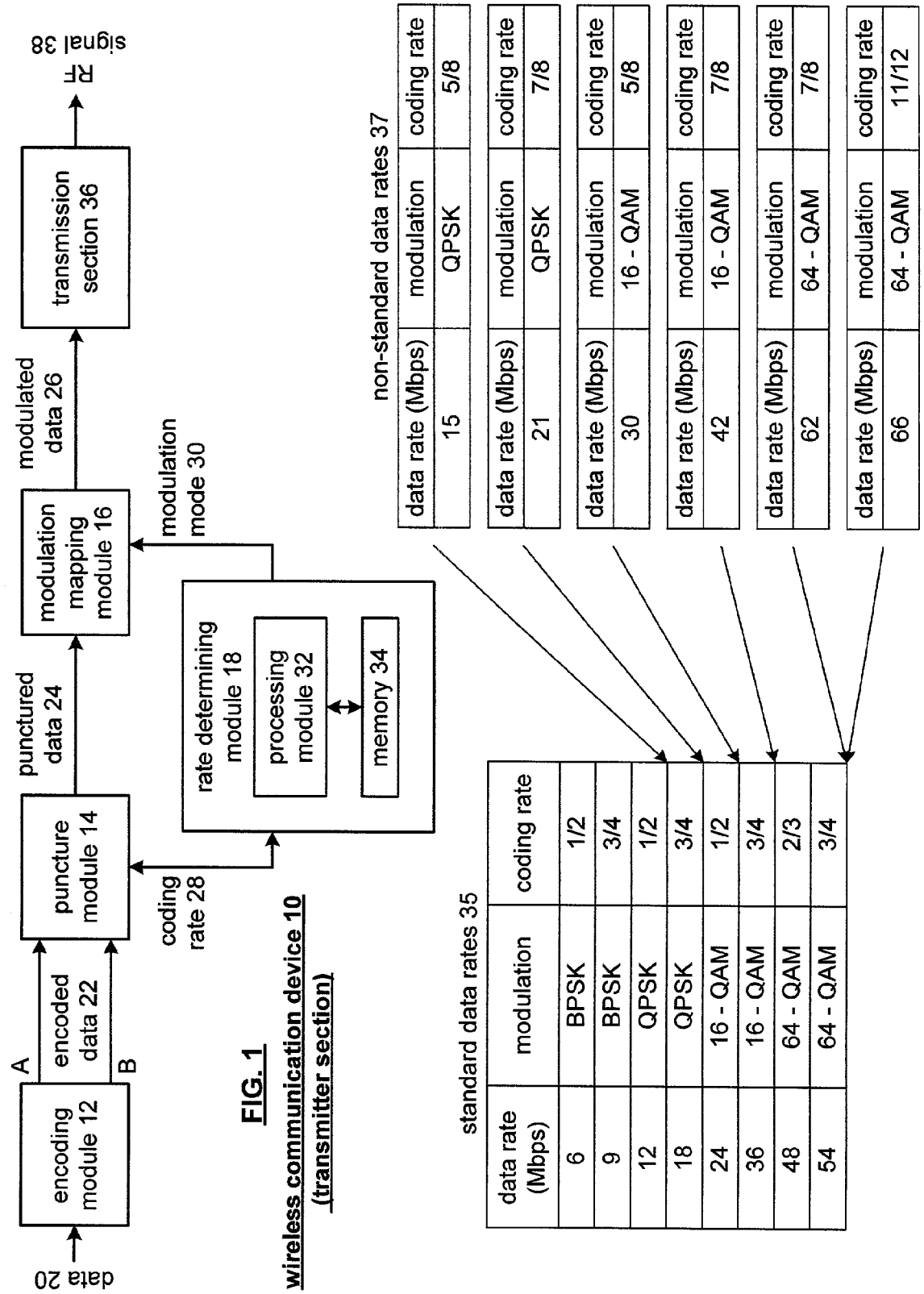
FIG. 1 illustrates a schematic block diagram of a transmitter section of a wireless communication device in accordance with the present invention.

The present invention can be more fully described with reference to FIGS. 1 through 6. FIG. 1 illustrates a schematic block diagram of a transmitter section of a wireless communication device 10. The wireless communication device 10 includes an encoding module 12, a puncture module 14, a modulation mapping module 16, a transmission section 36, and a rate determining module 18. The rate determining module 18 includes a processing module 32 and memory 34. As one of average skill in the art will appreciate, the encoding module 12, the puncture module 14, and the mapping module 16 may be implemented as separate components, within a common processor, and/or within the processing module 32 and memory 34.

The processing module 32 may be a single processing device or a plurality of processing devices. Such a processing device may be a microprocessor, micro-controller, digital signal processor, microcomputer, central processing unit, field programmable gate array, programmable logic device, state machine, logic circuitry, and/or any device that manipulates signals (analog and/or digital) based on operational instructions. The memory 34 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 32 implements one or more of its functions via a state machine or logic circuitry, the memory storing the corresponding operational instructions is embedded with the circuitry comprising the state machine or logic circuitry. The memory 34 stores, and the processing module 32 executes, operational instructions corresponding to at least some of the steps illustrated in FIGS. 3, 4, and 6.

The encoding module 12 is operably coupled to receive data 20 and produce therefrom encoded data 22. For an IEEE 802.11a compliant wireless communication device, the encoding module 12 performs a convolution encoding that produces two outputs, A and B. In addition, the encoding module 12 may interleave the encoded data bits in a block size that corresponds to the number of bits in a single orthogonal frequency division multiple (OFDM) symbol.

The puncture module 14 receives the encoded data and increases the data rate to produce punctured data 24. For an IEEE 802.11a compliant device, the puncture module 14 omits some of the encoded bits in the transmitter such that the receiver inserts a dummy "zero" metric into the convolution decoder in place of the omitted bits. The particular level at which the rate is increased corresponds to the coding rate 28 provided by the rate determining module 18.

The modulation mapping module 16 receives the punctured data 24 and maps it to produce the modulated data 26. For an IEEE 802.11a compliant device, the modulation mapping module 16 maps the punctured data 24 based on a particular modulation mode 30. For IEEE 802.11a, the modulation modes include BPSK, QPSK (quadrature phase shift keying), 16 QAM, or 64 QAM. The transmission section 36 receives the modulated data 26, up-converts it to an RF frequency, and transmits it as an RF signal 38.

The rate determining module 18, performs at least some of the operations illustrated in FIGS. 3 through 6 to determine a particular coding rate 28 and modulation mode 30. In general, the rate determining module 18, within memory 34, stores the standard data rates 35. For an IEEE 802.11a, the standard data rates are as shown in FIG. 1. In addition, the rate determining module 18 determines whether the wireless communication device 10 can support non-standard data rates. Such a determination is made based on signal strength and/or interference levels. For example, assume that the rate determining module 18 determines that the wireless communication device 10 could not support a data rate of 24 Mbps but could support a rate of 18 Mbps. Having made this determination, the rate determining module 18 determines an error rate and corresponding error margin of the selected standardized data rate (e.g., 18 Mbps) based on one or more factors including received signal strength indication, bit error rate, acknowledgment back of transmitted signals, signal-to-noise ratio, signal-to-interference ratio, packet error rate, bit error rate, et cetera. If a sufficient error margin exists, the rate determining module 18 determines a non-standard data rate and a corresponding modulation scheme from a non-standard data rate table 37. For this example, the rate determining module 18 selects the non-standard data rate of 21 Mbps and a QPSK modulation mode 30. The rate determining module 18 indicates to the puncture module 14 and the modulation mapping module 16 the selected non-standard data rate and corresponding modulation mode through the coding rate signal 28 (e.g., which is set to ⅞) and the modulation mode signal 30, respectively.

The rate determining module 18 may also determine non-standard data rates that lie between the standard rates of 12 and 18 Mbps, between 24 and 36 Mbps, between 36 and 48 Mbps, between 48 and 54 Mbps and above 54 Mbps as shown in FIG. 1. In addition to changing the data rates to non-standard data rates, for example, 15, 21, 30, 42, 62 or 66 megabits-per-second, the rate determining module 18 may also use a non-standard modulation technique.

Figure 2:
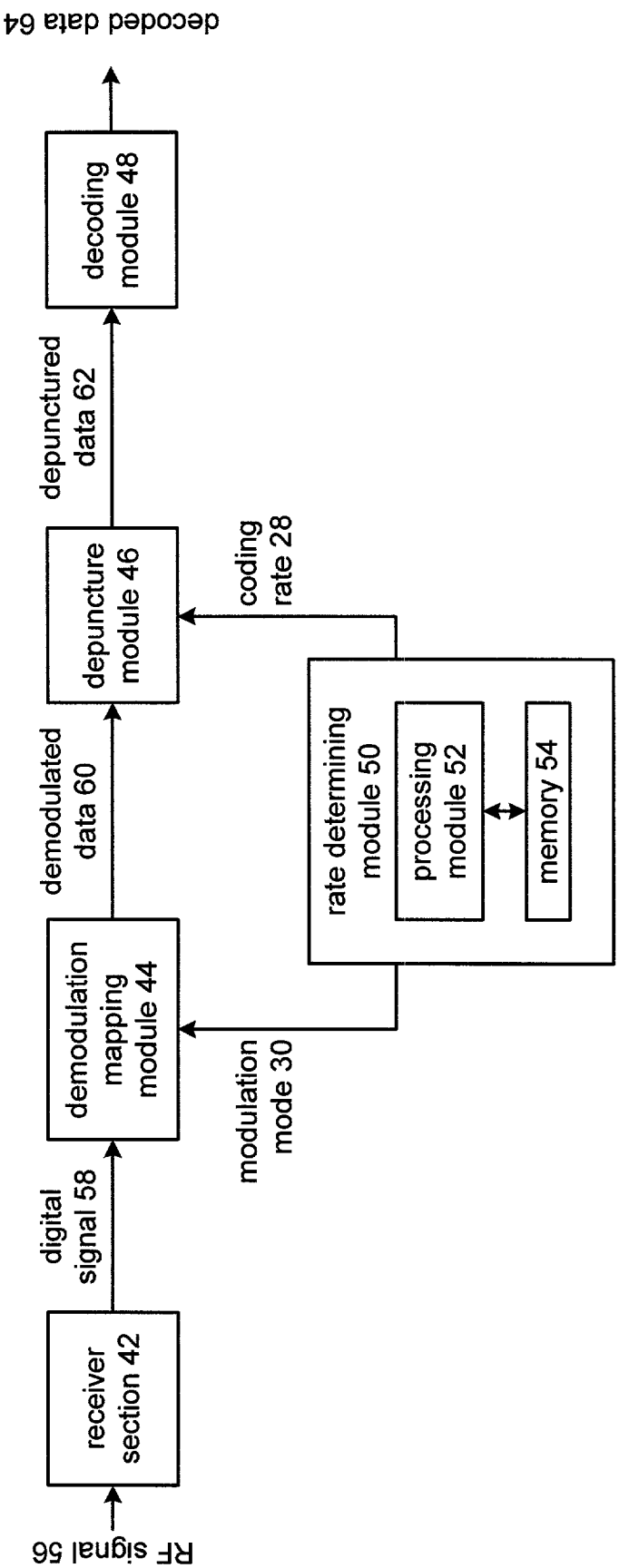
FIG. 2 illustrates a receiver section of a wireless communication device in accordance with the present invention.

FIG. 2 illustrates a receiving section of a wireless communication device 40. The wireless communication device 40 includes a receiver section 42, demodulation mapping module 44, depuncture module 46, decoding module 48 and a rate determining module 50. The rate determining module 50 includes a processing module 52 and memory 54. As one of average skill in the art will appreciate, the demodulation mapping module 44, depuncture module 46, and the decoding module 48 may be implemented as separate components, within a common processor, and/or within the processing module 52 and memory 54.

The processing module 52 may be a single processing device or a plurality of processing devices. Such a processing device may be a microprocessor, micro-controller, digital signal processor, microcomputer, central processing unit, field programmable gate array, programmable logic device, state machine, logic circuitry, and/or any device that manipulates signals (analog and/or digital) based on operational instructions. The memory 54 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 52 implements one or more of its functions via a state machine or logic circuitry, the memory storing the corresponding operational instructions is embedded with the circuitry comprising the state machine or logic circuitry. The memory 54 stores, and the processing module 52 executes, operational instructions corresponding to at least some of the steps illustrated in FIGS. 3, 4, and 6.

The rate determining module 50 includes the standard data rates 35 and non-standard data rates 37 as illustrated in FIG. 1. In operation, the receiving section 42 receives an RF signal 56, down-converts the RF signal 56 to a base-band signal, and filters it to produce a digital signal 58. The demodulation mapping module 44 demodulates the digital signal 58 to produce demodulated data 60. The rate determining module 50 interprets the digital signal 58 to determine the particular coding rate 28 and modulation mode 30 used to encode the data conveyed by the RF signal 56. Once determined, the rate determining module 50 generates the modulation mode 30 and coding rate 28, which are provided to the demodulation mapping module 44 and the depuncture module 46, respectively.

Having received the modulation mode signal 30, the demodulation mapping module 44 demodulates the digital signal 58 accordingly to produce demodulated data 60. The depuncture module 46 subsequently depunctures (i.e., reduces the data rate) the demodulated data 60, based on the coding rate 28, to produce depunctured data 62. Next, the decoding module 48 decodes the depunctured data 62 to produce decoded data 64.

As one of average skill in the art will appreciate, if the wireless communication device includes both a transmitter section and receiver section, processing module 32 and processing module 52 may be the same processing module. Similarly, memory 34 and memory 54 may be the same memory. As one average skill in the art will further appreciate, the processing module and memory may be utilized to implement the encoding module 12, puncture module 14 and/or mapping module 16. In addition, the processing module and memory may be used to implement the demodulation mapping module 44, depuncture module 46 and/or decoding module 48.

FIG. 3 illustrates a logic diagram of a method for establishing a non-standard data rate in a wireless communication system. The processing begins at Step 70 where a standard specified data rate is established for a given transmission. In one embodiment, this may be done by selecting a standard rate of a plurality of standard data rates from a table. For example, the standard data rate may default to the minimal data rate of 6 megabits-per-second using BPSK modulation. As one of average skill in the art will appreciate, any of the standard data rates and corresponding modulation schemes may be used to establish the particular data rate for Step 70.

The process then proceeds to Step 72 where a determination is made as to whether the data rate of the given transmission can be adjusted to a non-standard data rate. The details of the determination will be described in greater detail with reference to FIG. 6. If not, the process proceeds to Step 74 where the standard specified data rate is used for the given transmission.

If, however, the rate can be adjusted, the process proceeds to Step 76. At Step 76, the standard specified data rate is adjusted by a non-standard data rate adjustment to produce a non-standard data rate for the given transmission. To change to the non-standard data rate, the coding rate is changed to correspond to a non-standard coding rate. Alternatively, and/or in addition to, the non-standard data rate adjustment may correspond to selecting a different constellation encoding, which corresponds to a non-standard constellation encoding scheme.

The process then proceeds to Step 78 where a message is sent to indicate the non-standard data rate to a wireless communication device that is targeted to receive the data transmission. Note that the message may be sent in the normal course of transmission utilizing the training sequence to establish the non-standard data rate.

FIG. 4 illustrates a logic diagram that illustrates an alternate embodiment for establishing the standard specified data rate. This may be done during the training period of a frame or plurality of frames for the given transmission. The process begins at Step 80 where a 1$^{st}$ standard data rate of the plurality of data rates is selected for the given transmission. This may be done by making an arbitrary selection from the standard data rates or based on a histogram of previously used standard data rates. Such a histogram may be based on a single previously used standard data rate or a plurality of previously used standard data rates.

The process then proceeds to Step 82 where a determination is made as to whether the selected standard data rate provides an acceptable error rate. The determination of the acceptable error rate will be graphically described with reference to FIG. 5 below.

If the selected data rate does not provide an acceptable error rate, the process proceeds to Step 84 where another standard data rate of the plurality of standard data rates is selected. Having done this, the process repeats at Step 82. If, however, the selected standard data rate provides an acceptable error rate, the process proceeds to Step 86. At Step 86, the selected standard data rate is used as the standard specified data rate.

Figure 5:
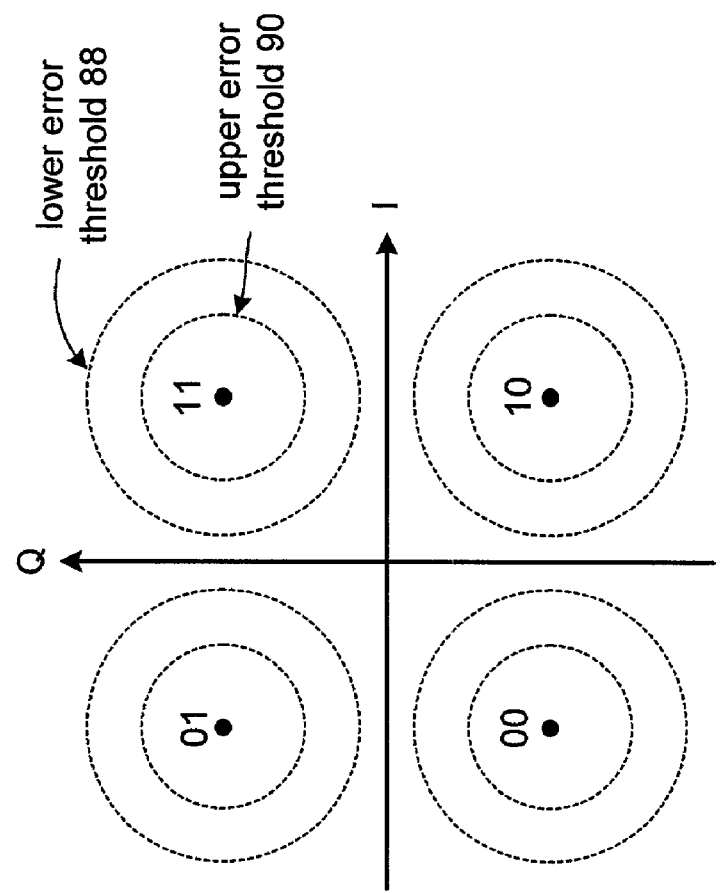
FIG. 5 illustrates a graphical diagram of error thresholds in accordance with the present invention.

FIG. 5 illustrates the mapping of a QPSK modulation scheme. As shown, the 2-bit representation is symbolically represented by the quadrant in which the data point is received. In actual data transmissions, the received symbols will fall in one of the four quadrants forming a scatter pattern around the ideal location (the ideal location is illustrated in FIG. 5). If the scatter pattern is widely concentrated, i.e., indicating that the signal power to noise power ratio is below the lower error threshold 88, the error rate is too great thus indicating a non-acceptable error rate. As such, the data rate would need to be decreased for this particular example. If on the other hand, the scatter pattern is narrowly concentrated with respect to the upper error threshold 90, this would indicate that signal power to noise power ratio is high, thus allowing the data rate to be increased. As one of average skill in the art will appreciate, the error may be interpreted utilizing one or more of received signal strength indication, bit error rate, percentage of acknowledgments of data transmissions, signal-to-noise ratio, packet error rate, signal-to-interference ratio, and/or bit error rate.

Figure 6:
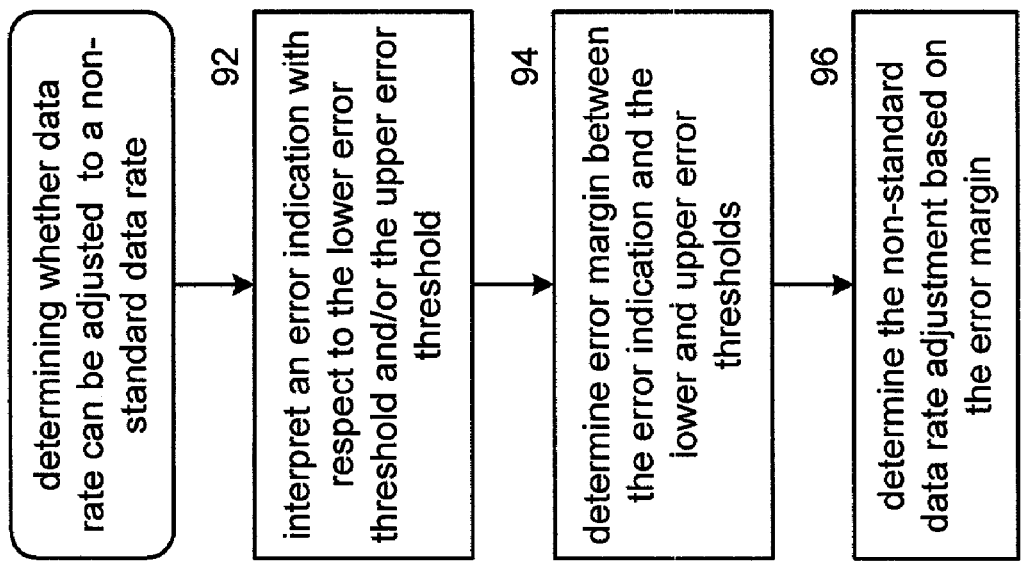
FIG. 6 illustrates a logic diagram that further describes Step 72 of FIG. 3.

FIG. 6 illustrates a logic diagram that provides an embodiment for determining whether the data rate can be adjusted to a non-standard data rate. The process begins at Step 92 where an error indication is interpreted with respect to the lower error threshold and/or the upper error threshold. This is done by comparing the signal power to noise power ratio with the lower error threshold 88 and the upper error threshold 90 to provide the error indication.

The process then proceeds to Step 94 where an error margin is determined between the error indication and the upper and lower thresholds. Referring back to FIG. 5, the error margin indicates the difference between the circumference of the error scatter pattern and the lower error threshold 88 and the upper error threshold 90, i.e., the difference between the actual signal power to noise power ratio and the ratio for the upper and lower thresholds 88 and 90. For example, if the scatter pattern circumference is close to the lower error threshold 88, there is a small error margin. If, however, the scatter pattern is close to the upper error threshold 90, there is a larger error margin.

The process then proceeds to Step 96 where the non-standard data rate adjustment is determined based on the error margin. The determination of the non-standard data rate may be done by incrementally adjusting the data rate to non-standard data rates. Having made the adjustment, the error margin is determined for the newly adjusted non-standard data rate. If the error margin is small, i.e., the scatter pattern is close to the lower error threshold 88, that particular non-standard data rate is used. If, however, there is still sufficient error margin, the data rate is incremented to the next non-standard data rate level and the error margin is determined for this level. In practice, one would want the scatter pattern for the non-standard data rate to lie substantially near the lower error threshold 88, thus maximizing the bandwidth of a given channel.

With such a method and apparatus, non-standard data rates may be utilized within a standard compliant wireless communication system to provide finer granularity of channel use. Such finer granularity is particularly useful in local area networks that transmit video data. Accordingly, by providing finer granularity in data rates, additional video streams may be transmitted thereby increasing the capabilities of a local area network. As one of average skill in the art will appreciate, other embodiments may be derived from the teachings of the present invention without deviating from the scope of the claims.

What is claimed is:

1. A method for establishing a non-standard data rate in a wireless communication system, the method comprises:
    establishing a standard specified data rate for a given data transmission;
    determining whether data rate of the given data transmission can be adjusted from the standard specified data rate by a non-standard data rate adjustment; and
    when the data rate of the given data transmission can be adjusted from the standard specified data rate by a non-standard data rate adjustment, adjusting the standard specified data rate by the non-standard data rate adjustment to produce a non-standard data rate of the given data transmission.

2. The method of claim 1, wherein the establishing the standard specified data rate further comprises:
    selecting a first standard data rate of a plurality of standard data rates for the given transmission;
    determining whether the first standard data rate provides an acceptable error rate for the given transmission;
    when the first standard data rate provides an acceptable error rate, utilizing the first standard data rate as the standard specified data rate; and
    when the first standard data rate does not provide an acceptable error rate, selecting another standard data rate of the plurality of standard data rates until the another standard data rate provides the acceptable error rate.

3. The method of claim 2, wherein the selecting the first standard data rate further comprises at least one of:
    selecting lowest standard data rate of the plurality of standard data rates;
    selecting highest standard data rate of the plurality of standard data rates;
    selecting an arbitrary one of the plurality of standard data rates;
    selecting the first standard data rate based on a histogram of previously used standard data rates of a wireless communication device of the given data transmission; and
    selecting the first data rate based on standard data rates utilized to support other data transmissions.

4. The method of claim 2 further comprises:
    determining whether the first standard data rate provides an acceptable error rate by:
        determining whether an error indication is less than a lower error threshold;
    when the first standard data rate does not provide an acceptable error rate, selecting the another standard data rate of the plurality of standard data rates to have a greater data rate than the first standard data rate.

5. The method of claim 2 further comprises:
    determining whether the first standard data rate provides an acceptable error rate by:
        determining whether an error indication is greater than an upper error threshold;
    when the first standard data rate does not provide an acceptable error rate, selecting the another standard data rate of the plurality of standard data rates to have a lower data rate than the first standard data rate.

6. The method of claim 1, wherein the determining the standard specified data rate further comprises:
    selecting a standard data rate of a plurality of standard data rates for the given transmission.

7. The method of claim 1, wherein the determining whether the data rate of the given data transmission can be adjusted from the standard specified data rate by a non-standard data rate adjustment further comprises:
    interpreting an error indication with respect to at least one of: a lower error threshold and an upper error threshold;
    determining error margin between the error indication and the at least one of the lower and upper error thresholds; and
    determining the non-standard data rate adjustment based on the error margin.

8. The method of claim 7, wherein the determining the non-standard data rate adjustment further comprises at least one of:
    incrementing the data rate of the given data transmission by at least one non-standard data rate increment based on the error margin; and
    calculating the non-standard data rate adjustment as a function of at least one of: the error margin, the standard specified data rate, the lower error threshold, the upper error threshold, and the error indication.

9. The method of claim 1, adjusting the standard specified data rate by the non-standard data rate adjustment further comprises at least one of:
    changing a coding rate to a non-standard code that corresponds to the non-standard data rate; and
    changing constellation encoding to a non-standard constellation encoding scheme.

10. The method of claim 1 further comprises:
    sending a message indicating the non-standard data rate to a wireless communication device of the given data transmission.

11. A wireless communication device capable of transmitting data using non-standard data rates in a wireless communication system, the wireless communication device comprises:
    encoding module operably coupled to encode data based on a coding rate to produce encoded data;
    puncture module operably coupled to increase rate of the encoded data based on the coding rate to produce a punctured data;
    modulation mapping module operably coupled to modulate the punctured data to produce modulated data;
    rate determination module operably coupled to produce the coding rate by:
        identifying one of a plurality of standard data rates for a given data transmission;
        determining whether the one of the plurality of standard data rates for the given data transmission can be adjusted by a non-standard data rate adjustment; and
        when the data rate of the given data transmission can be adjusted by a non-standard data rate adjustment, adjusting the one of the plurality of standard data rates by the non-standard data rate adjustment to produce the coding rate.

12. The wireless communication device of claim 11 further comprises:
   transmission section operably coupled to convert the modulated data into a radio frequency signal.

13. The wireless communication device of claim 11 further comprises:
   processing module; and
   memory operably coupled to the processing module, wherein the memory includes operational instructions that cause the processing module to:
   function as the modulation mapping module to modulate the punctured data based on a modulation mode; and
   function as the rate determination module to generate the modulation mode by:
      determining whether one of the plurality of standard modulation modes for the given data transmission can be adjusted to a non-standard modulation mode; and
      when the one of the plurality of standard modulation modes for the given data transmission can be adjusted to a non-standard modulation mode, setting the modulation mode to the non-standard modulation mode.

14. The wireless communication device of claim 13, wherein the memory further comprises operational instructions that cause the processing module to determine whether the data rate of the given data transmission can be adjusted from the standard specified data rate by a non-standard data rate adjustment by:
   interpreting an error indication with respect to at least one of: a lower error threshold and an upper error threshold;
   determining error margin between the error indication and the at least one of the lower and upper error thresholds; and
   determining the non-standard data rate adjustment based on the error margin.

15. The wireless communication device of claim 14, wherein the memory further comprises operational instructions that cause the processing module to determine the non-standard data rate adjustment by at least one of:
   incrementing the data rate of the given data transmission by at least one non-standard data rate increment based on the error margin; and
   calculating the non-standard data rate adjustment as a function of at least one of: the error margin, the standard specified data rate, the lower error threshold, the upper error threshold, and the error indication.

16. The wireless communication device of claim 13, wherein the memory further comprises operational instructions that cause the processing module to adjust the standard specified data rate by the non-standard data rate adjustment by at least one of:
   changing a coding rate to a non-standard code that corresponds to the non-standard data rate; and
   changing constellation encoding to a non-standard constellation encoding scheme.

17. A wireless communication device capable of transmitting data using non-standard data rates in a wireless communication system, the wireless communication device comprises:
   processing module; and
   memory operably coupled to the processing module, wherein the memory includes operational instructions that cause the processing module to:
      establishing a standard specified data rate for a given data transmission;
      determining whether data rate of the given data transmission can be adjusted from the standard specified data rate by a non-standard data rate adjustment; and
      when the data rate of the given data transmission can be adjusted from the standard specified data rate by a non-standard data rate adjustment, adjusting the standard specified data rate by the non-standard data rate adjustment to produce a non-standard data rate of the given data transmission.

18. The wireless communication device of claim 17, wherein the memory further comprises operational instructions that cause the processing module to establish the standard specified data rate by:
   selecting a first standard data rate of a plurality of standard data rates for the given transmission;
   determining whether the first standard data rate provides an acceptable error rate for the given transmission;
   when the first standard data rate provides an acceptable error rate, utilizing the first standard data rate as the standard specified data rate; and
   when the first standard data rate does not provide an acceptable error rate, selecting another standard data rate of the plurality of standard data rates until the another standard data rate provides the acceptable error rate.

19. The wireless communication device of claim 18, wherein the memory further comprises operational instructions that cause the processing module to select the first standard data rate by at least one of:
   selecting lowest standard data rate of the plurality of standard data rates;
   selecting highest standard data rate of the plurality of standard data rates;
   selecting an arbitrary one of the plurality of standard data rates;
   selecting the first standard data rate based on a histogram of previously used standard data rates of a wireless communication device of the given data transmission; and
   selecting the first data rate based on standard data rates utilized to support other data transmissions.

20. The wireless communication device of claim 18, wherein the memory further comprises operational instructions that cause the processing module to:
   determine whether the first standard data rate provides an acceptable error rate by:
      determining whether an error indication is less than a lower error threshold;
   when the first standard data rate does not provide an acceptable error rate, select the another standard data rate of the plurality of standard data rates to have a greater data rate than the first standard data rate.

21. The wireless communication device of claim 18, wherein the memory further comprises operational instructions that cause the processing module to:
   determine whether the first standard data rate provides an acceptable error rate by:
      determining whether an error indication is greater than an upper error threshold;
   when the first standard data rate does not provide an acceptable error rate, select the another standard data rate of the plurality of standard data rates to have a lower data rate than the first standard data rate.

22. The wireless communication device of claim 17, wherein the memory further comprises operational instructions that cause the processing module to determine the standard specified data rate by:

selecting a standard data rate of a plurality of standard data rates for the given transmission.

23. The wireless communication device of claim 17, wherein the memory further comprises operational instructions that cause the processing module to determine whether the data rate of the given data transmission can be adjusted from the standard specified data rate by a non-standard data rate adjustment by:

interpreting an error indication with respect to at least one of: a lower error threshold and an upper error threshold;

determining error margin between the error indication and the at least one of the lower and upper error thresholds; and determining the non-standard data rate adjustment based on the error margin.

24. The wireless communication device of claim 23, wherein the memory further comprises operational instructions that cause the processing module to determine the non-standard data rate adjustment by at least one of:

incrementing the data rate of the given data transmission by at least one non-standard data rate increment based on the error margin; and calculating the non-standard data rate adjustment as a function of at least one of: the error margin, the standard specified data rate, the lower error threshold, the upper error threshold, and the error indication.

25. The wireless communication device of claim 17, wherein the memory further comprises operational instructions that cause the processing module to adjust the standard specified data rate by the non-standard data rate adjustment by at least one of:

changing a coding rate to a non-standard code that corresponds to the non-standard data rate; and changing constellation encoding to a non-standard constellation encoding scheme.

26. The wireless communication device of claim 17, wherein the memory further comprises operational instructions that cause the processing module to:

send a message indicating the non-standard data rate to a wireless communication device of the given data transmission.

* * * * *

UNITED STATES PATENT AND TRADEMARK OFFICE
CERTIFICATE OF CORRECTION

| | |
|---|---|
| PATENT NO. | : 7,099,398 B1 |
| APPLICATION NO. | : 10/026129 |
| DATED | : August 29, 2006 |
| INVENTOR(S) | : Girardeau, Jr. et al. |

It is certified that error appears in the above-identified patent and that said Letters Patent is hereby corrected as shown below:

Title page, item (12), delete "Girardeau et al." and insert --Girardeau, Jr. et al.--

Title page, item (75) Inventor: Delete "James Ward Girardeau" and insert --James Ward Girardeau, Jr.--.

Signed and Sealed this

Ninth Day of January, 2007

JON W. DUDAS
*Director of the United States Patent and Trademark Office*